US007327698B1

(12) United States Patent
Anselmo

(10) Patent No.: US 7,327,698 B1
(45) Date of Patent: Feb. 5, 2008

(54) METHOD AND SYSTEM FOR PROVIDING SATELLITE COMMUNICATIONS USING ON-ORBIT PAYLOAD CONFIGURATION AND RECONFIGURATION

(75) Inventor: Carl S. Anselmo, Rancho Palos Verdes, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 09/325,110

(22) Filed: Jun. 3, 1999

(51) Int. Cl.
H04B 7/185 (2006.01)

(52) U.S. Cl. .................. 370/316; 370/330; 370/321; 455/12.1; 455/3.02

(58) Field of Classification Search ............. 370/316, 370/330, 329, 468, 319, 321, 323, 203, 400, 370/328, 238, 351, 325, 394, 389, 474, 315; 342/354, 359, 368, 371, 372, 373, 457; 455/12.1, 455/418, 98, 265, 275, 3.02, 575.1, 550.1, 455/63.1, 67.11, 256, 165.1, 136, 516, 515, 455/450, 13.2, 183.1, 179.1, 180.1, 13.3, 455/255–260, 13.1, 427, 428, 429, 430, 431, 455/196.1; 244/176, 158 R, 164, 171; 343/388, 343/356, 100, 103, 105 R
See application file for complete search history.

(56) References Cited

U.S. PATENT DOCUMENTS

| 4,472,720 A | * | 9/1984 | Reesor ................ 343/388 |
| 4,799,065 A | | 1/1989 | Thompson |
| 4,858,225 A | | 8/1989 | DeSantis |
| 4,882,587 A | | 11/1989 | Vodopia |
| 4,931,802 A | * | 6/1990 | Assal et al. ................ 342/356 |
| 5,073,930 A | * | 12/1991 | Green et al. .................. 725/69 |
| 5,430,729 A | * | 7/1995 | Rahnema ................. 270/94.1 |
| 5,519,404 A | * | 5/1996 | Cances et al. ............. 342/354 |
| 5,640,166 A | * | 6/1997 | Siwiak ..................... 342/354 |
| 5,813,634 A | * | 9/1998 | Pizzicaroli et al. ......... 244/176 |
| 5,926,758 A | * | 7/1999 | Grybos et al. ............. 455/429 |
| 5,936,588 A | | 8/1999 | Rao et al. |
| 5,936,592 A | | 8/1999 | Ramanujam et al. |
| 5,963,845 A | * | 10/1999 | Floury et al. ............. 455/12.1 |
| 6,021,309 A | * | 2/2000 | Sherman et al. .......... 455/12.1 |
| 6,031,502 A | | 2/2000 | Ramanujam et al. |
| 6,043,727 A | | 3/2000 | Warneke et al. |
| 6,069,587 A | | 5/2000 | Lynch et al. |
| 6,125,261 A | | 9/2000 | Anselmo et al. .......... 455/12.1 |
| 6,157,621 A | * | 12/2000 | Brown et al. .............. 370/310 |
| 6,173,178 B1 | * | 1/2001 | Hammill et al. ........... 455/429 |
| 6,182,927 B1 | * | 2/2001 | Galvin .................... 244/158 |

(Continued)

FOREIGN PATENT DOCUMENTS

EP 0 854 590 A 7/1998

(Continued)

Primary Examiner—Edward F. Urban
Assistant Examiner—Charles Chow

(57) ABSTRACT

A system for providing high frequency data communications in a satellite-based communications network includes a plurality of communications satellites each having uplink and downlink antennas capable of receiving and transmitting a plurality of signals. Each of said satellites have a communication control circuit. At least one of said satellites is reconfigurable. The reconfigurable satellite has a programmable frequency synthesizer coupled to the communications control circuit. A controller is located on the satellite and is coupled to the communications control circuit. The controller controls a frequency reconfiguration of the communications control circuit through the programmable frequency synthesizer.

25 Claims, 4 Drawing Sheets

| U.S. PATENT DOCUMENTS | | | |
|---|---|---|---|
| 6,192,217 B1 | 2/2001 | Farrell | |
| 6,205,319 B1 * | 3/2001 | Wiswell et al. | 455/12.1 |
| 6,272,317 B1 | 8/2001 | Houston et al. | 455/13.1 |
| 6,317,583 B1 * | 11/2001 | Wolcott et al. | 455/12.1 |
| 6,324,381 B1 | 11/2001 | Anselmo et al. | 455/12.1 |
| 6,336,030 B2 | 1/2002 | Houston et al. | |
| 6,377,561 B1 * | 4/2002 | Black et al. | 370/330 |
| 6,438,354 B2 | 8/2002 | Thompson et al. | |
| 2001/0034206 A1 * | 10/2001 | Thompson et al. | 455/12.1 |

| FOREIGN PATENT DOCUMENTS | | |
|---|---|---|
| EP | 0 889 605 A | 1/1999 |
| EP | 0 915 529 A1 | 5/1999 |
| EP | 0915576 | 5/1999 |
| GB | 2295296 | 5/1996 |
| GB | EP 0854590 A2 * | 7/1998 |
| GB | EP 0889605 A2 * | 1/1999 |
| WO | WO 97/22189 | 6/1997 |

* cited by examiner

METHOD AND SYSTEM FOR PROVIDING SATELLITE COMMUNICATIONS USING ON-ORBIT PAYLOAD CONFIGURATION AND RECONFIGURATION

TECHNICAL FIELD

This invention relates to methods and systems for communicating high rate data to customers in satellite-based communications networks.

BACKGROUND OF THE INVENTION

A number of applications continue to drive the need for high-speed data transport. Industry specific examples include remote film editing, medical image transport, and financial service data consolidation and backup. Business communications and training further accelerate information transfer needs across all sectors. As business, government and educational institutions disseminate more information, greater importance is attached to data transfer. In this environment, reliable, high-speed video and data transport becomes even more critical.

Furthermore, a tremendous growth in Internet traffic has caused a strain on the capacity of telephony networks. Network shortcomings include network outages, insufficient access bandwidth, and insufficient internode bandwidth. Currently, providers need to make significant investments, as well as experience installation delays, to upgrade network infrastructure, yet they cannot pass the costs on to the end users.

Corporate LANs/WANs also generate an insatiable demand for higher bandwidth. The demand for bandwidth goes up as more and more users are connected. The users, in turn, demand more services and improved network speed. Personal computers are being used to process not only text, but graphics and video as well, all on networks that are increasingly global. Widespread implementation of corporate intranets and extranets further drive the move to increased bandwidth applications. High-speed networking is also driven by the growth of video distribution, client/server technology, decentralized systems, increased processing power and developments in storage capacity.

To meet the high demand, networks of satellites are used to provide varied coverage as well as provide capacity. These satellites may be in geostationary, middle or low earth orbit. In many systems, not all the satellites are used to capacity at any given time.

Another drawback to various networks is that the life cycle of a network may exceed 10-15 years. During the life of the network, the needs of users will most likely change, but due to lack of flexibility of the electronics, the system may not be able to address all of the new user needs. Therefore, more satellites may have to be launched or the system will remain inadequate.

Known systems are typically deployed with little internal flexibility to accommodate changing requirements over the life of the system. Also, if a satellite within the system fails, service may be interrupted. Other satellites in the network may be called upon to provide back-up. However, some net loss in service is likely since the electronic payload may not be configurable to match the service provided by the failed satellite. If, however, the payload characteristics do not match, then, a net loss of overall service capacity will result.

A system such as that disclosed in commonly owned co-pending patent application Ser. Nos. 08/867,672 and 09/159,332 have fixed spot beams and scanned spot beams. The beams are reconfigured to provide satellite coverage to various areas upon the earth. By changing the phase and amplitude coefficients, various spot beam areas of coverage may be configured. One drawback to such a system is that other system parameters such as the communication frequencies are generally fixed in the satellite. Thus, the satellite is not usable for other satellites within the system.

It would therefore be desirable to provide a satellite-based communications system capable of minimizing service coverage loss within a satellite system if a satellite fails. It would further be desirable to provide a satellite with the capability to be reconfigured over the life of the satellite to meet the changing requirements of system users.

DISCLOSURE OF THE INVENTION

In one aspect of the invention, a system for providing high frequency data communications in a satellite-based communications network includes a plurality of communications satellites each having uplink and downlink antennas capable of receiving and transmitting a plurality of signals, each of said satellites have a communication control circuit. At least one of said satellites is reconfigurable. The reconfigurable satellite has a programmable frequency synthesizer coupled to a communications control circuit. A controller is located on the satellite and is coupled to the communications control circuit. The controller controls a frequency reconfiguration of the communications control circuit through the programmable frequency synthesizer.

In a further aspect of the invention, a method of configuring a satellite system that has a plurality of satellites comprises the steps of: deploying a reconfigurable satellite; transmitting reconfiguration instructions to said satellite; reconfiguring the payload of the configurable satellite; repositioning a satellite from a network position; and moving the reconfigurable satellite into the network position.

One advantage of the invention is that a reconfigurable satellite system may be provided with little cost penalty to the overall system cost.

Other features and advantages of the present invention are readily apparent from the following detailed description of the best mode for carrying out the invention when taken in connection with the accompanying drawings.

DESCRIPTION OF THE PREFERRED EMBODIMENTS

Figure 1:
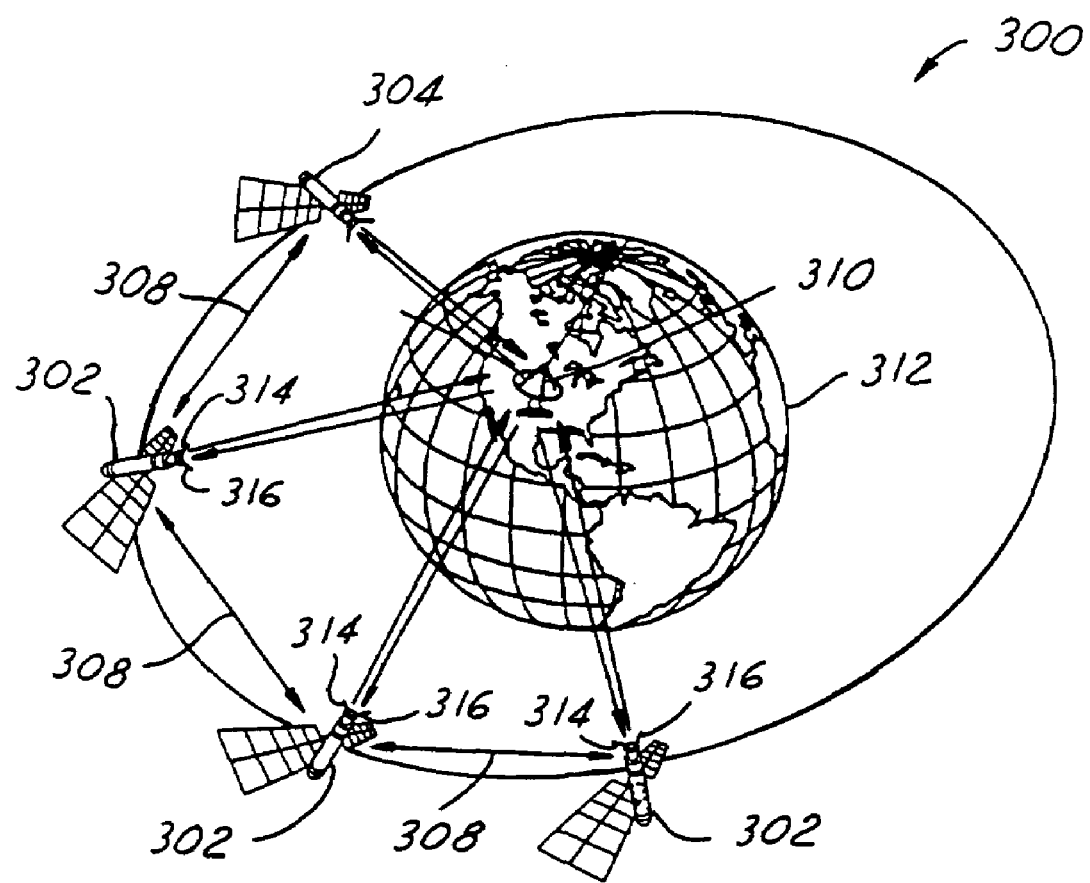
FIG. 1 is a schematic illustration of a portion of a constellation of communications satellites, in which at least one satellite is reconfigurable to form a reconfigurable network according to the present invention.

In the following description, identical reference numerals are used to identify identical compounds in the figures. The present invention applies to various types of satellites suitable of fixed, broadcast or mobile applications. The present invention is also suitable for satellites in various orbits such as low, medium and geostationary orbits. Various shaped orbits such as inclined, elliptical or eccentric may be employed.

Referring to FIG. 1, the present system is suitable for use in a reconfigurable satellite system 300 generally having satellites 302 and having at least one reconfigurable satellite 304. Satellites 302 form a satellite network 306. Reconfigurable satellite 304 acts as an orbital spare, or, as described below, may be a part of network 306. Satellite 302 and 304 may be interconnected by a radio frequency (RF) or an optical link generally represented by arrows 308. Satellites 302, 304 may be medium earth orbit satellites (MEOs), low earth orbit satellites (LEOs) or geosynchronous orbit satellites (GSOs) having various shaped orbits such as elliptical, circular or inclined.

Satellites 302, 304 communicate with a ground station 310 located on earth 312. Satellites 302, 304 may communicate with fixed and mobile user terminals on earth 312. Spot beams may be used to communicate with earth 312. Ground station 310 generates command signals as well as communication network signals to satellites 302, 304.

Each satellite 302, 304 has an uplink antenna 314 and a downlink antenna 316. Uplink antennas 314 receive communication signals and command signals from ground station 310. Communication signals to ground station 310 from satellites 302, 304 are transmitted via downlink antennas 316.

If one of satellites 302 becomes non-functional or is no longer capable of providing the coverage desired, reconfigurable satellite 304 may be moved into the orbital slot of the satellite to be replaced. Reconfigurable satellite 304 may also be used for replacing more than one satellite as well.

Figure 2:
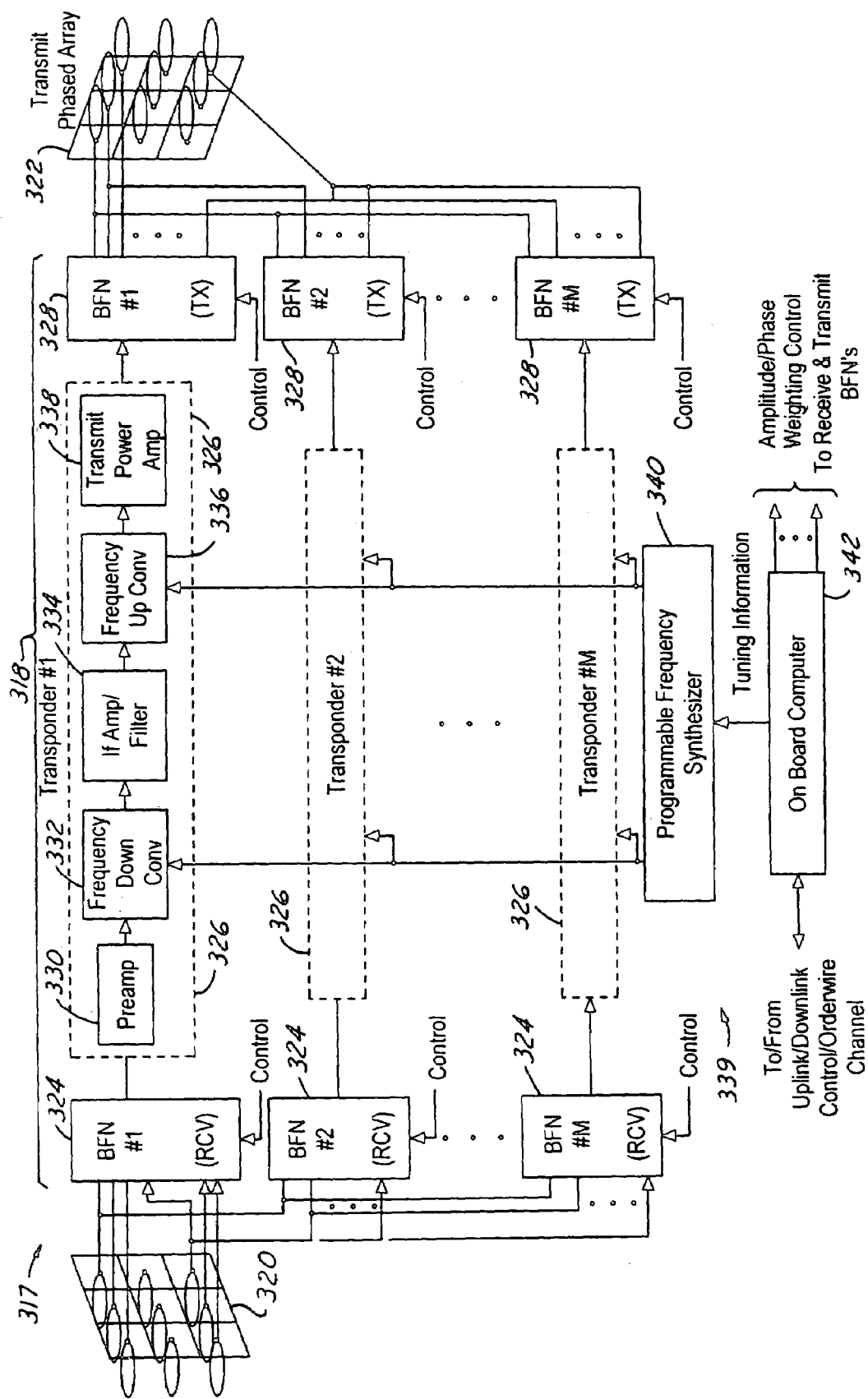
FIG. 2 is a schematic view of a payload system employing an example of a suitable antenna.

Referring now to FIG. 2, the reconfigurable satellite has a payload 317 and a communication control circuit 318 that is coupled to a receive array 320 and a transmit array 322. Receive array 320 may be part of uplink antenna 314. Transmit array 322 may be part of downlink antenna 316.

Communications control circuit 318 has a plurality of receive beam-forming networks 324 that are each coupled to a transponder 326. Transmit array 322 is coupled to a plurality of transmit and beam forming networks 328. Each beam forming network 328 is coupled to a transponder 326.

Each transponder 326 has a preamplifier 330 coupled to beam forming network 324. Preamplifier 330 is coupled to a frequency down converter 332. Preamplifier 330 and frequency down converter 332 amplify the received signal from receive array 320. Frequency down converter 332 controls the frequency that is received by receive array 320. Frequency down converter 332 is coupled to an intermediate frequency (IF) amplifier/filter 334. IF amplifier/filter 334 is coupled to a frequency up converter 336, which is coupled to a transmit power amplifier 338. Transmit power amplifier 338 is coupled to transmit beam forming network 328. Transponder 326 receives information from receive array 320, processes the information, and transmits the information through transmit array 322.

To form reconfigurable satellite 304, a reconfiguration, circuit 339 has a programmable frequency synthesizer 340 coupled to frequency down converter 332 and frequency up converter 336. Programmable frequency synthesizer 340 is used to change the frequency of frequency down converter 332 and frequency up converter 336. An onboard computer 342 may receive information from uplink antenna 314 and may transmit information to downlink antenna 316. Other information transmitted and received by onboard computer 342 may be amplitude and phase weighting coefficients for controlling the direction of the transmit and receive phased arrays. This information can be received by the satellite on dedicated RF links or by means of an "order wire" circuit coupled into the onboard computer. Alternatively, the weighting coefficients can be computed onboard the satellite as well. The amplitude and phase weighting coefficients are used to reconfigure the beam to obtain the desired beam pattern. Beam patterns may vary from narrow spot beams and to broader coverage beams such as regional area beams.

Programmable frequency synthesizer 340 uses a digitally controlled phase lock loop for tunability over a narrow frequency range. Programmable frequency synthesizer 340 is used to align the frequencies of the reconfigurable satellite with the satellite that is to be replaced. Due to the flexibility of a programmable frequency synthesizer, the reconfigurable satellite may be used to match the characteristics of the satellite it is replacing.

Figure 3:
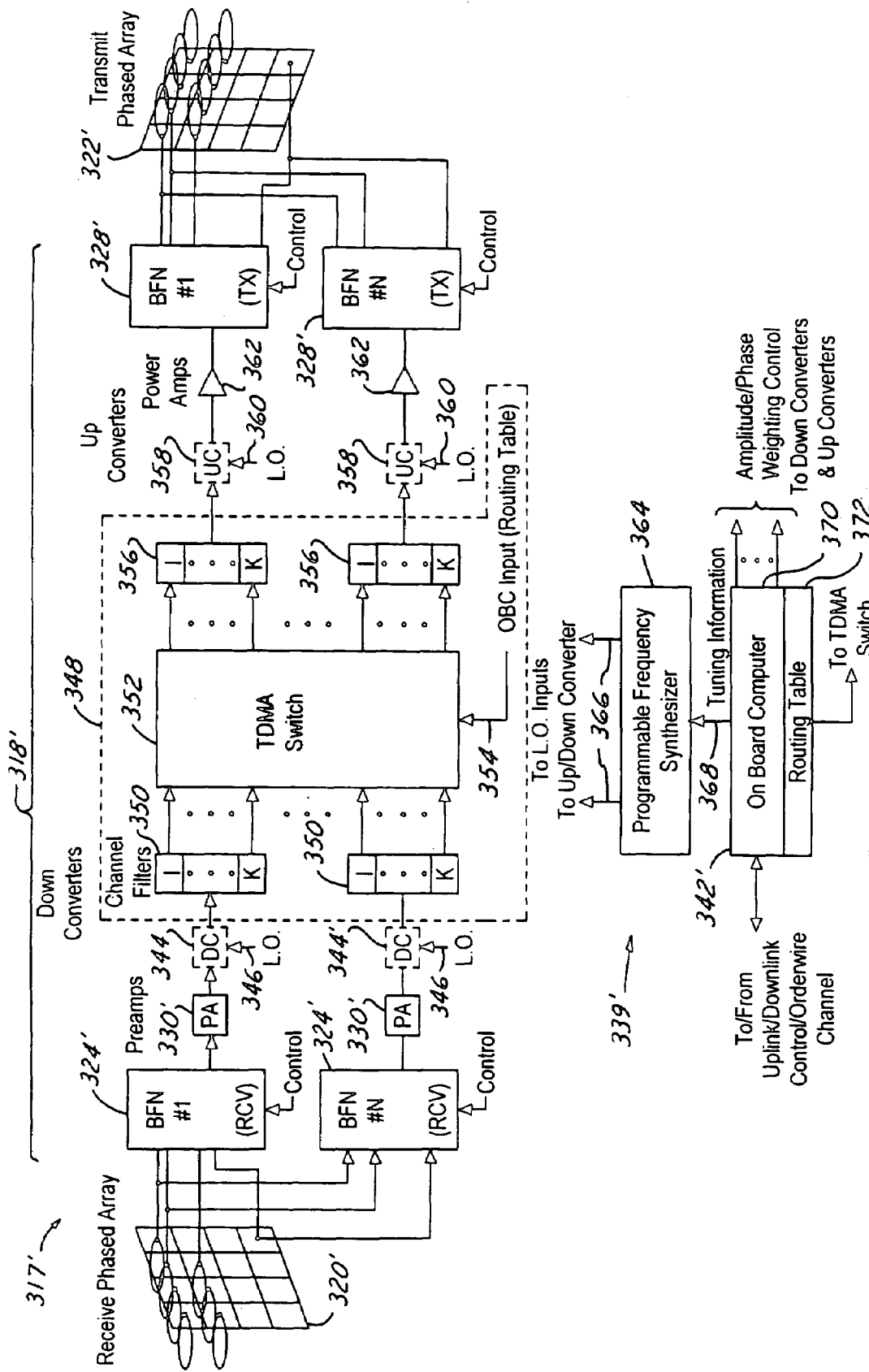
FIG. 3 is a schematic view of a reconfigurable satellite payload system according to the present invention using a TDMA switch.

Referring now to FIG. 3, an alternative payload 317' is illustrated from that of FIG. 2. A receive array 320' and a transmitter 322' are coupled to a communication control circuit 318'. Communication control circuit 318' has receive beam forming networks 324 coupled to receive array 320'. Each beam forming network 324 is coupled to a preamplifier 330'. A down converter 344 is coupled to preamplifier 330'.

Each down converter 344 has a local oscillator input 346 that is used to set the down converter frequency.

Each down converter 344 is coupled to a switch circuit 348. Switch circuit 348 has channel filters 350 coupled to down converter 344.

A time division multiple access switch (TDMA) 352 is coupled to channel filters 350. TDMA switch 352 has an onboard computer input 354 that may be coupled to a routing table as will be further described below. TDMA switch 352, as described above, provides interlinking of all beams, services, and users, and dedicated point to point and point to multi-point services. TDMA switch 352 switches signals to be transmitted either to the same uplink beam as the source signal was transmitted from or by another downlink beam based on the time interval assigned to the source signal according to onboard computing input 354. TDMA switch 352 is gated within the time domain to provide precise windows of time to different desired outputs. Various TDMA switches 352 are known in the art.

Channel multiplexers 356 are also included within switch circuit 348. Channel multiplexers 356 have various inputs from TDMA switch. The output of channel multiplexers 356 are coupled to an up converter 358. Each up converter 358 has a local oscillator input 360. Each up converter 358 is coupled to a power amplifier 362. Each power amplifier 362 is coupled to a beam forming network 328' such as those described above. Each beam forming network 328' is coupled to transmit array 322'.

Communications control circuit 318' has a reconfiguration circuit 339' that has a programmable frequency synthesizer 364. Programmable frequency synthesizer 364 has programmable frequency synthesizer outputs 366 that are coupled to local oscillator inputs 346 of down converter 344 and local oscillator inputs 360 of up converter 358. Programmable frequency synthesizer 364 has an input 368 coupled to an onboard computer 370. Onboard computer 370 provides tuning information to programmable frequency synthesizer 364 through input 368.

Onboard computer 370 is coupled to a routing table 372. Routing table 372 is coupled to onboard computer input 354 of TDMA switch 352. Routing table 372 stores information as to the desired beam width and times associated with each beam. Onboard computer 370 may be coupled to an order wire and to and from uplink and downlink control. Onboard computer 370 may also control amplitude phase and weighting control as described above.

Figure 4:
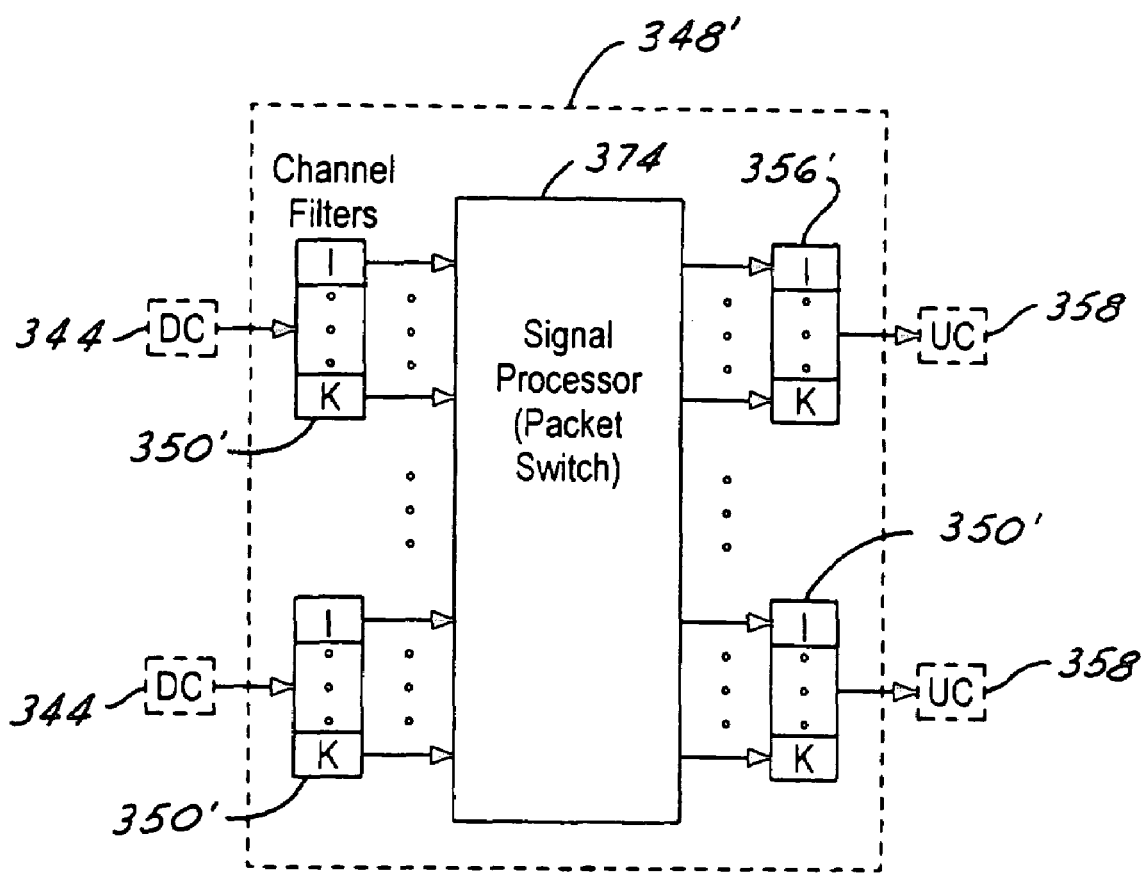
FIG. 4 is alternative schematic view of a portion of the reconfigurable satellite system according to the present invention wherein the TDMA switch is replaced by a packet switch.

Referring now to FIG. 4, an alternative switch circuit 348' is shown that may be substituted for switch circuit 348 of FIG. 3. Switch circuit 348 has channel filters 350' and channel multiplexers 356' that are respectively coupled to down converters 344 and up converters 358. In FIG. 4, the TDMA switch 352 of FIG. 3 has been replaced by a signal processor packet switch 374. Various types of packet switches 374 are known to those skilled in the art.

In operation, when various portions of payload are desired to be reconfigured such as antenna reconfiguration, frequency reconfiguration, or beam to beam reconfiguration, a ground station by way of an order wire or control channel may be transmitted to the satellite to update the on-board look-up table. The onboard computer may be used to calculate amplitude and phase weighting coefficients necessary to synthesize uplink and downlink beams. The programmable frequency synthesizer coupled to onboard computer is used to control the communication frequencies.

Alternatively, onboard computer may be used to update the routing table periodically or occasionally from an order wire or RF control channel from the ground station during operation of the satellite.

If a reconfigurable satellite is to be moved to replace a satellite within a network, east/west and north/south station keeping may be used in a conventional manner so that the reconfigurable satellite may be placed in the proper orbital position. When the satellite is moved into the proper position and after the satellite has been properly configured to replace the satellite from the network, the reconfigurable satellite may continue to operate. The reconfigurable satellite may also be reconfigured at any time during the operation of the satellite.

While the best modes for carrying out the invention have been described in detail, those familiar with the art to which this invention relates will recognize various alternative designs and embodiments for practicing the invention as defined by the following claims.

What is claimed is:

1. A system for providing high frequency data communications in a satellite-based communications network, the system comprising:
   a plurality of communications satellites each having uplink and downlink antennas capable of receiving and transmitting a plurality of signals, each of said satellites having a communication control circuit;
   at least one of said satellites being a reconfigurable satellite having a programmable frequency synthesizer coupled to an up converter and a down converter of a communications control circuit;
   a routing table storing tuning information therein;
   a controller located on said satellite coupled to said communications control circuit, said controller controlling a frequency reconfiguration of said communications control circuit from a first frequency range to a second frequency range through said programmable frequency synthesizer in response to said tuning information.

2. A system as recited in claim 1 wherein each of said satellites further comprising a beam forming network coupled to said uplink and downlink antennas.

3. A system as recited in claim 1 wherein said communications control circuit comprises an up converter and a down converter.

4. A system as recited in claim 1 wherein said communications control circuit comprises a transponder.

5. A system as recited in claim 4 wherein said transponder comprises an up converter and a down converter.

6. A system as recited in claim 1 wherein said communications control circuit comprises a time division multiple access switch.

7. A system as recited in claim 1 wherein said communications control circuit comprises a packet switch.

8. A system as recited in claim 1 wherein said plurality of communications satellites have an orbit selected from the group consisting of a LEO, MEO and GSO.

9. A payload circuit for a satellite comprising:
   a receive array;
   a receive beam forming network;
   a transmit array;
   a transmit beam forming network;
   a communications control circuit for controlling communications of said satellite, said communications control circuit being an up converter and a down converter; and
   a reconfiguration circuit coupled to the communications control circuit for reconfiguring the communications control circuit, said reconfiguration circuit comprising a programmable frequency synthesizer coupled to the up converter and down converter, an on-board computer and a routing table having tuning information stored therein, said on-board computer controlling a reconfiguration of said communications control circuit from a first frequency range to a second frequency range through said programmable frequency synthesizer in response to said tuning information.

10. A payload circuit as recited in claim 9 wherein said communications control circuit comprises a transponder.

11. A payload circuit as recited in claim 10 wherein said transponder comprises the up converter and the down converter.

12. A payload circuit as recited in claim 9 wherein said communications control circuit comprises a time division multiple access switch.

13. A payload circuit as recited in claim 9 wherein said communications control circuit comprises a packet switch.

14. A method of configuring a satellite system having a plurality of satellites comprising the steps of:
   deploying a reconfigurable satellite;
   transmitting reconfiguration instructions to said satellite;
   reconfiguring the frequency configuration of the payload of the reconfigurable satellite in response to the tuning information in a routing table by changing an up converter frequency and down converter frequency from a first frequency range to a second frequency range using a programmable frequency synthesizer;
   repositioning a satellite from a network position; and
   moving the reconfigurable satellite into the network position.

15. A method as recited in claim 14 wherein the step of reconfiguring a satellite comprises changing the amplitude or phase coefficients of a transmit and receive beam.

16. A method as recited in claim 14 further comprising storing tuning information in a routing table.

17. A method as recited in claim 14 wherein the step of reconfiguring the payload comprises changing the amplitude or phase coefficients of a beam in response to the tuning information in the routing table.

18. A method as recited in claim 14 wherein moving the reconfigurable satellite is performed using east/west station keeping.

19. A method as recited in claim 14 wherein moving the reconfigurable satellite is performed using north/south station keeping.

20. A method as recited in claim 14 further comprising updating the routing table from an order wire.

21. A method as recited in claim 14 further comprising updating the routing table from an RF control channel.

22. A method of configuring a satellite comprising:
deploying a reconfigurable satellite;
storing frequency tuning information in a routing table;
transmitting reconfiguration instructions to said satellite;
reconfiguring the frequency configuration of the payload of the reconfigurable satellite in response to the tuning information in the routing table by changing an up converter frequency and down converter frequency from a first frequency range to a second frequency range using a programmable frequency synthesizer.

23. A method as recited in claim 22 wherein the step of reconfiguring the payload comprises changing the amplitude or phase coefficients of a beam in response to the tuning information in the routing table.

24. A method as recited in claim 22 further comprising updating the routing table from an order wire.

25. A method as recited in claim 22 further comprising updating the routing table from an RF control channel.

* * * * *